United States Patent [19]

Yoshino et al.

[11] 4,231,257
[45] Nov. 4, 1980

[54] SLOPE SENSOR FOR A VEHICLE

[75] Inventors: Yasuhisa Yoshino, Okazaki; Akira Kuno, Oobu; Yoshio Shinoda, Okazaki, all of Japan

[73] Assignee: Nippon Soken, Inc., Nishio, Japan

[21] Appl. No.: 31,968

[22] Filed: Apr. 20, 1979

[30] Foreign Application Priority Data

Jun. 23, 1978 [JP] Japan .................................. 53/76776

[51] Int. Cl.³ .............................................. G01C 23/00
[52] U.S. Cl. ............................... 73/432 CR; 33/141.5;
73/179
[58] Field of Search ................. 73/178 T, 179, 432 R;
33/141.5, 142

[56] References Cited

U.S. PATENT DOCUMENTS

| 2,552,890 | 5/1951 | Eisler | 33/141.5 |
| 3,054,295 | 9/1962 | Burner | 73/432 R |
| 3,496,769 | 2/1970 | Victor | 73/178 T |

Primary Examiner—S. Clement Swisher
Attorney, Agent, or Firm—Cushman, Darby & Cushman

[57] ABSTRACT

First and second sample-hold circuits sample and hold the atmospheric pressure alternately every time when a vehicle travels a predetermined distance. A signal representing a difference between the holding values of the first and second sample-hold circuits, that is, a signal representing a slope of the road on which the vehicle is travelling is displayed through a latch circuit.

2 Claims, 4 Drawing Figures

SLOPE SENSOR FOR A VEHICLE

BACKGROUND OF THE INVENTION

This invention relates to a slope sensor for a vehicle which detects the slope of a road on which the vehicle is travelling.

A publicly known slope sensor has such a mechanical structure that the slope of a vehicle is detected with a vertical line indicated by weight as a reference. So, because of vibrations, deceleration and/or acceleration it can not accurately measure a slope of a road while the vehicle is travelling. This has been also the case with a vehicle when it is inclined by the weight of a load and occupants.

SUMMARY OF THE INVENTION

The object of this invention is to provide a slope sensor which can display the value of a slope accurately while the vehicle is running.

The invention is based on the fact that the atmospheric pressure decreases by about 1.2 millibars with an increase of altitude of 10 m. The above object is attained by determining the slope from a travel distance and an atmospheric pressure difference.

DESCRIPTION OF THE PREFERRED EMBODIMENT

Figure 1:
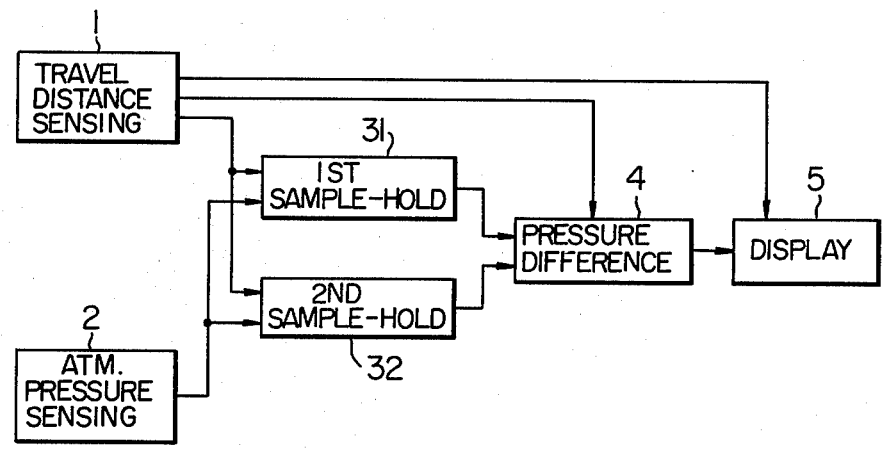
FIG. 1 is a block diagram showing a whole rough construction of one embodiment of this invention.

An embodiment of this invention will be explained hereinafter. In FIG. 1 showing a whole rough construction of the embodiment, the reference numeral 1 denotes a distance sensor for sensing a travel distance of a vehicle, 2 an atmospheric pressure sensor for sensing a momentarily varying atmospheric pressure, 31 and 32 first and second sample-hold circuits for sampling and holding a pressure signal from the atmospheric pressure sensor 2 alternately by a travel distance signal at each predetermined travel distance. The reference numeral 4 denotes a pressure difference sensing circuit which detects a difference between the outputs of the first sample-hold circuit 31 and the second sample-hold circuit 32. Numeral 5 denotes a slope display circuit which converts the output of the pressure difference sensing circuit 4 into a slope value and displays it. The slope sensor constituted by the above elements is formed in an integral body and placed on a dashboard or a meter panel.

Figure 2:
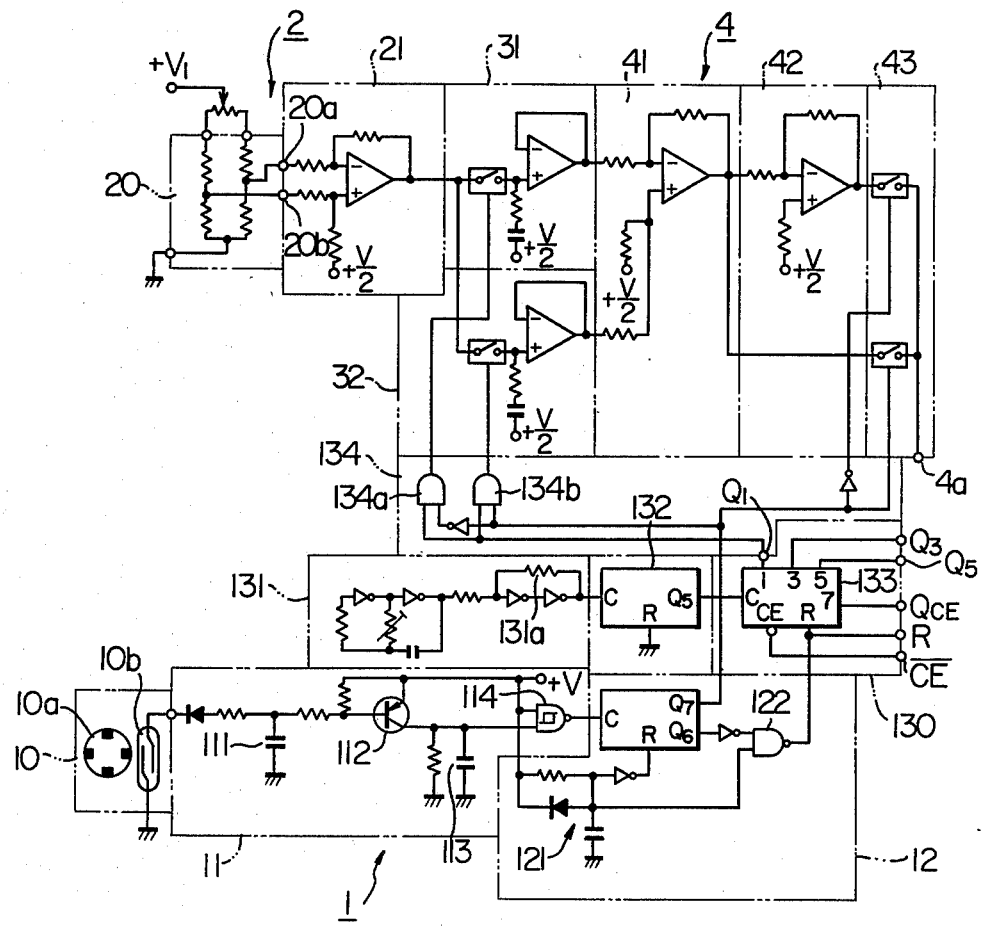
FIGS. 2 and 3 are detailed electric connection diagrams showing the main parts of the embodiment of FIG. 1.

The operation of the above slope sensor will be explained next with reference to FIGS. 2 and 3, which demonstrate detailed electric connection diagrams of FIG. 1. The numeral 10 denotes a distance sensor having a reed switch 10b which generates four pulses at one revolution of magnets 10a connected to a publicly known speedometer cable shaft. In the present embodiment, the distance sensor 10 generates one pulse signal at a travel distance of about 0.4 m. Numeral 11 is a waveshaper circuit which shapes the waveform of the signal from the distance sensor 10 and is constituted by a capacitor 111, a waveshaping transistor 112, a noise filter circuit 113 and a NAND gate 114 having a hysteresis characteristic. Numeral 12 is a counter circuit which counts the pulse signal from the waveshaper 11. The counter 12 is constructed for example by a publicly known integrated circuit CD4024 of RCA and generates a reset signal for a later-mentioned control signal generating circuit 130 at every 64th pulse at its sixth output stage $Q_6$ and generates a gate signal for a later-mentioned sample-hold circuits 31 and 32 and a switching circuit 43 at every 128th pulse at its seventh output stage $Q_7$. Numeral 121 denotes a circuit for generating a reset pulse at switch-on time of a power supply (+V). Numeral 122 denotes a NAND gate for giving a reset pulse to the control signal generating circuit 130. A clock signal is generated by a clock signal generating circuit 131, shaped by a waveform shaping circuit 131a and applied to the control signal generating part 130. A frequency dividing circuit 132 in the control signal generating part 130, which is constructed for example by an integrated circuit CD4024 of RCA, frequency-divides the clock signals and generates a signal of about 100 Hz at a fifth output stage $Q_5$. This signal is applied to a frequency dividing circuit 133 constructed for example by a publicly known integrated circuit CD4017 of RCA. The frequency dividing circuit 133 is reset by the counter circuit 12 and, in response to first, third, fifth and seventh pulses of the frequency dividing circuit 132, and it generates a sample-hold signal $Q_1$, ±20% sensing signal $Q_3$, a latch signal $Q_5$ and a clock inhibiting signal $Q_{CE}$ at its first, third, fifth and seventh output stages [1], [3], [5] and [7], respectively. In the gate circuit 134, AND gates 134a and 134b are opened alternately by a gate signal $Q_7$ of the frequency dividing circiut 132 at each 64th distance pulse signal, i.e., every vehicle travelling distance of 25.6 m (=0.4 m×64), thereby to make analog switches in the sample-hold circuits 31 and 32 alternately conductive.

Figure 4:
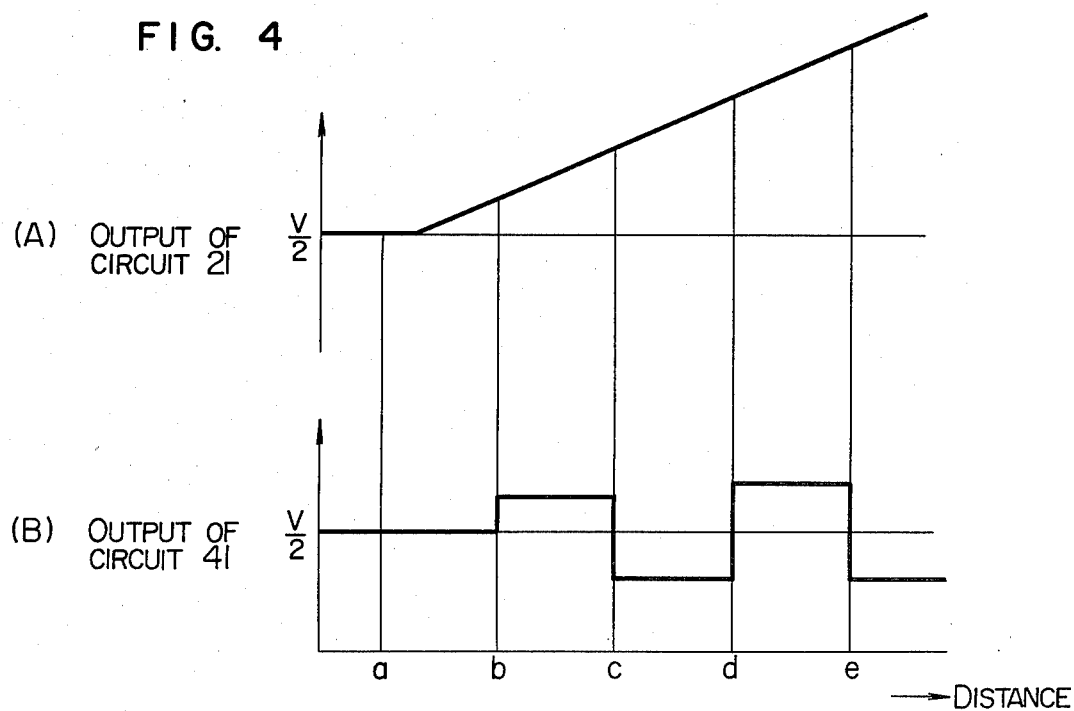
FIG. 4 is reference diagrams for explaining the role of an inverter circuit in FIG. 2.

In the atmospheric pressure sensor 20 using a publicly known diaphragm type semiconductor pressure sensor, an air-tightly formed chamber is separated by a diaphragm from the atmosphere (e.g., in an engine compartment or vehicle cabin), and a displacement of the diaphragm is detected by a bridged pressure-resistance transducer element. A voltage proportional to the atmospheric pressure is generated across output terminals 20a and 20b. It is publicly known that the diaphragm surface is made to contact with the atmosphere through a filter or an orifice having a ventilation resistance in order not to respond to a casual pressure variation. A small output voltage is amplified by an amplifying circuit 21 formed by a publicly known integrated circuit, e.g., µA725 of Fairchild Inc. The amplified voltage is applied to first or second sample-hold circuit 31 or 32 constructed by an analog switch using an integrated circuit such as CD4066 of RCA, a capacitor and an integrated circuit CA3130 (operational amplifier) of RCA. These sample-hold circuits 31 and 32 hold the atmospheric pressure signal alternately, in response to the alternative turning-on of the analog switches, by the sample-hold signal $Q_1$ at each 25.6 m travel of vehicle. The atmospheric pressure signals held by the capacitors of the first and second sample-hold circuits 31 and 32 are applied to an inverted input terminal (−) and a non-inverted input terminal (+) of an operational amplifier circuit 41 formed by an integrated circuit, e.g., µA725 of Fairchild Inc., which generates an amplified difference signal. The signal is phase-inverted by an inverter circuit 42 formed by an integrated circuit, e.g., μA741 of Fairchild Inc. The outputs of the inventer 42 and the operational amplifier 41 appear alternately at a terminal 4a as an output signal of an atmospheric pressure difference sensor circuit 4 through a switching circuit 43 formed by an analog switch of a publicly known integrated circuit e.g., CD4066 of RCA. In FIG. 4 for explanating the role of the inverter circuit 42, accordingly as the travel distance increases from a to e as shown by (A) in FIG. 4, in increasing atmospheric pressure signal is applied to the first and second sample-hold circuits 31 and 32. Then, the output of the differential amplifier 41 changes its phase alternately as shown by (B) in FIG. 4. In order to avoid this unfavorable situation, the phase is inverted by the inverter circuit 42 such that the result of subtraction of a previous sample-hold value from a present sample-hold value appears at the terminal 4a.

Figure 3:
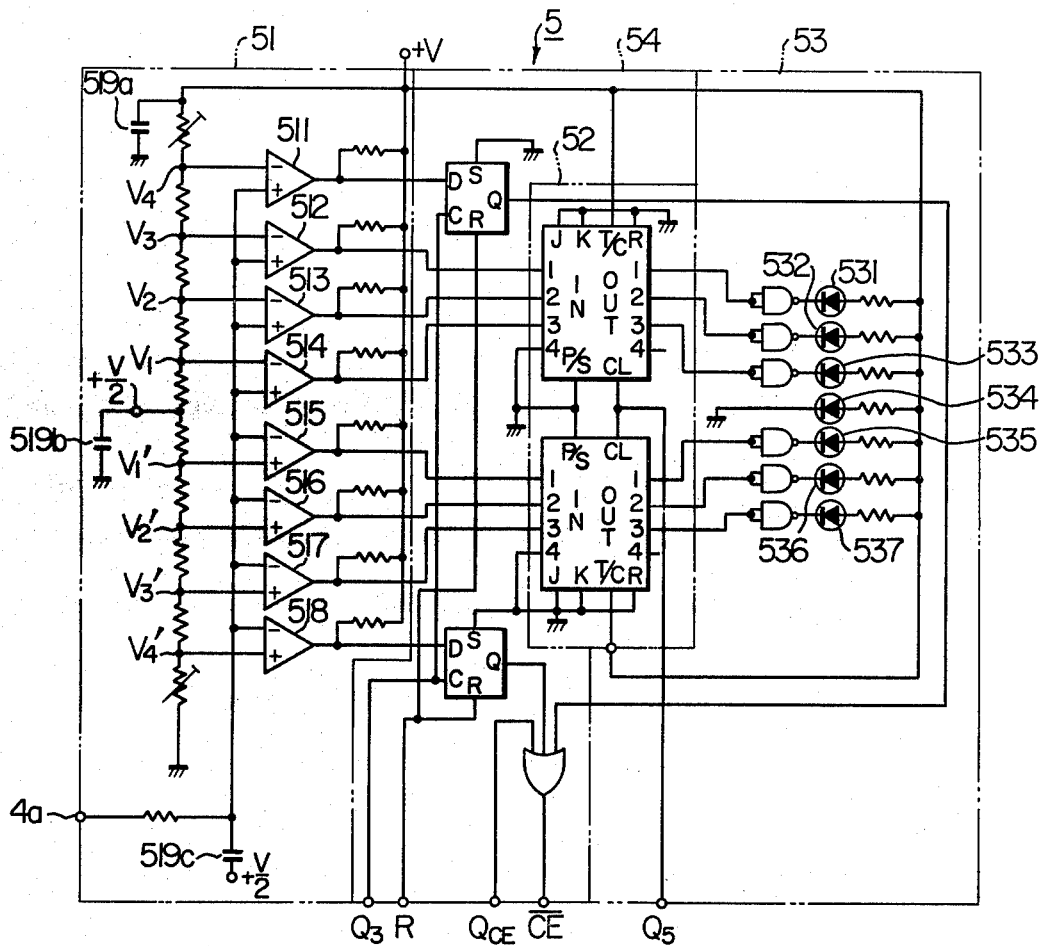

When the output signal of the atmospheric pressure difference sensing circuit 4 is applied to a slope display circuit 5 in FIG. 3, it is compared with reference voltages $V_1;V_1'$, $V_2;V_2'$, $V_3;V_3'$ and $V_4;V_4'$ corresponding to slopes $\pm 2.5\%$, $\pm 5\%$, $\pm 10\%$ and $\pm 20\%$ by comparators 511 to 518 of a comparator circuit 51, which are formed by a publicly known integrated circuit MC3302 of Motorola Inc. Depending on the signal value, a digital signal "1" or "0" appears at the output of each comparator. In this embodiment, it is so arranged that in the case of an ascendingly slope the output of each comparator becomes "1" or "0" according as the input signal is higher or lower than the respective reference voltage $V_1$, $V_2$, $V_3$, or $V_4$, while in the case of a descending slope the output of each comparator becomes "0" or "1" according as the signal is higher or lower than the respective reference voltage $V_1'$, $V_2'$, $V_3'$ or $V_4'$. Numerals 519a, 519b and 519c denote noise absorbing capacitors. These "1" or "0" signals are applied to a latch circuit 52 formed for example by a publicly known integrated circuit RCA CD4035, and they are latched at a time when the latch signal $Q_3$ is inputted. The latched signals are applied through output buffers of publicly known integrated circuit, for example, CD450107 of RCA to light emitting diodes 531 to 537 forming a bar graph display circuit 53. The light emitting diode 534 is always "on". When only this diode 534 is "on", it means that the slope is within $\pm 2.5\%$. When the slope exceeds $\pm 2.5\%$, at least one of the light emitting diodes 531 to 533 or at least one of the light emitting diodes 535 to 537 becomes "on" depending on the sign and the absolute value of the slope. When the atmospheric pressure varies to such an extent that the slope exceeds 20%, that is to say, when the output of the comparator 511 or 518 corresponding to one of $\pm 20\%$ slopes become "1" in the comparator circuit 51, a sensor circuit 54 for detecting a slope of more than $\pm 20\%$, which is formed by a publicly known integrated circuit CD4013 of RCA (used as two D-type flip-flops) and an OR gate, detects the "1" level signal from one of the comparators 511 and 518 in response to the signal $Q_3$ to generate a "1" level signal at the output of an OR gate. The "1" level signal is then applied to the clock inhibiting terminal $\overline{CE}$ of the frequency dividing circuit 133 to prevent any subsequent counting operation of the circuit 133. So, the signal is no longer displayed. In the figure, it is noted that a stabilized power supply voltage $+V$ is applied to the elements in the integrated circuit blocks, and a voltage $+V_1$ is also applied to the atmospheric pressure sensor 20. The voltages $+V$, $+V_1$ and $+V/2$ V may be generated by a stabilized power supply circuit (not shown) connected through a key switch to a car battery.

Although in the above embodiment a bar graph display using light emitting diodes is used, other displays such as a picture display and a lamp display, etc. may be used, or the output of the sensor circuit may be A-D converted for a numerical display. Furthermore, besides as a visible display, the thus detected slope value may be introduced into a system for controlling the travel of the vehicle as information data showing a load state of the vehicle. Although in the above embodiment, the hold value of an electric signal showing a slope value has operated two sample-hold circuits alternately, these circuits may be connected in cascade such that a signal held by the first sample-hold circuit be held by the second sample-hold circuit by a timing signal generated at each travel distance and immediately thereafter held again by the first sample-hold circuit. In such a case, the phase inversion as shown in FIG. 2 will not be necessary.

We claim:
1. A slope sensor for a vehicle comprising:
   travel distance sensor means for generating a timing signal each time a vehicle travels a predetermined distance;
   atmospheric pressure sensing means for generating an electric signal corresponding to an atmospheric pressure;
   first and second sample-hold means, connected to said travel distance sensor means and said atmospheric pressure sensor means, for alternately sample-holding said electric signal corresponding to an atmospheric pressure in response to said timing signal; and
   comparator means, connected to said first and second sample-hold means and said travel distance sensor means, for detecting a difference value of said electric signal held by said both sample-hold means.
2. A slope sensor for a vehicle according to claim 1 wherein said comparator means includes:
   an operational amplifier whose input terminals are connected to said first and second sample-hold means to generate a pressure difference signal representing a difference between the values held by said both sample-hold means;
   an inverter circuit connected to said operational amplifier, for generating a phase inverted signal of said pressure difference signal; and
   a switching circuit connected to said operational amplifier, said inverter circuit and said travel distance sensor means, for selectively passing one of said pressure difference signal and said inverted signal in response to said timing signal.

* * * * *